US005643972A

United States Patent [19]

Wang et al.

[11] Patent Number: 5,643,972

[45] Date of Patent: Jul. 1, 1997

[54] IMAGING ELEMENT

[75] Inventors: Yongcai Wang; Charles Chester Anderson, both of Penfield, N.Y.

[73] Assignee: Eastman Kodak Company, Rochester, N.Y.

[21] Appl. No.: 442,437

[22] Filed: May 16, 1995

Related U.S. Application Data

[62] Division of Ser. No. 221,432, Mar. 31, 1994, Pat. No. 5,447,832.

[51] Int. Cl.$^6$ ................................ C08K 9/00; C08F 2/16

[52] U.S. Cl. ......................... 523/206; 523/205; 524/458; 524/515; 428/142; 430/531; 430/535; 430/950

[58] Field of Search .................................... 524/560, 559, 524/563, 556, 458, 515; 430/535, 631, 950, 531, 523; 428/327, 142; 523/205, 206

[56] References Cited

U.S. PATENT DOCUMENTS

| | | | |
|---|---|---|---|
| 3,018,272 | 1/1962 | Grifton et al. . | |
| 3,929,489 | 12/1975 | Arcesi et al. . | |
| 4,069,186 | 1/1978 | Ramig | 260/29.06 |
| 4,134,872 | 1/1979 | Lee . | |
| 4,307,174 | 12/1981 | Noonan et al. . | |
| 4,394,442 | 7/1983 | Miller . | |
| 4,419,437 | 12/1983 | Noonan et al. . | |
| 4,478,907 | 10/1984 | Van Gossum et al. . | |
| 4,478,974 | 10/1984 | Lee et al. . | |
| 4,497,917 | 2/1985 | Upson et al. . | |
| 4,510,204 | 4/1985 | Duke et al. . | |
| 4,543,386 | 9/1985 | Padget et al. . | |
| 4,543,387 | 9/1985 | Padget et al. . | |
| 4,567,099 | 1/1986 | Van Gilder et al. . | |
| 4,613,633 | 9/1986 | Sekiya et al. . | |
| 4,683,269 | 7/1987 | Aksman . | |
| 4,704,309 | 11/1987 | Coney et al. . | |
| 4,738,785 | 4/1988 | Langston . | |
| 4,826,907 | 5/1989 | Murso et al. . | |
| 4,847,316 | 7/1989 | Schick et al. . | |
| 4,880,867 | 11/1989 | Gobel et al. . | |
| 4,883,706 | 11/1989 | Grosjean . | |
| 4,883,714 | 11/1989 | Stockl et al. . | |
| 4,954,559 | 9/1990 | Den Hartog et al. . | |
| 5,006,413 | 4/1991 | Den Hartog et al. . | |
| 5,006,451 | 4/1991 | Anderson et al. . | |
| 5,342,646 | 8/1994 | Kleese et al. | 427/2.1 |

FOREIGN PATENT DOCUMENTS

| | | |
|---|---|---|
| 0466409A1 | 7/1991 | European Pat. Off. . |

*Primary Examiner*—Thorl Chea
*Attorney, Agent, or Firm*—Carl F. Ruoff; Robert A. Gerlach

[57] ABSTRACT

An imaging element comprising a support, at least one light-sensitive layer and at least one coalesced layer of film-forming colloidal polymeric particles and non-film-forming colloidal polymeric particles.

12 Claims, No Drawings

IMAGING ELEMENT

This is a divisional of application Ser. No. 221,432, filed Mar. 31, 1994 now U.S. Pat. No. 5,447,832.

BACKGROUND OF THE INVENTION

Field of the Invention

This invention relates to imaging elements and more particularly to photographic imaging elements.

Support materials for imaging elements often employ layers comprising glassy, hydrophobic polymers such as polyacrylates, polymethacrylates, polystyrenes, or cellulose esters, for example. One typical application is as a backing layer to provide resistance to scratches, abrasion, blocking, and ferrotyping. The latter two properties relate to the propensity of layers applied onto the support material or imaging element to stick together as a result of the adverse humidity, temperature, and pressure conditions that may occur during the manufacture and use of the imaging element.

These glassy polymers are typically coated from organic solvent-based solutions to yield a continuous film upon evaporation of the solvent. However, because of environmental considerations, it is desirable to replace organic solvent-based coating formulations with water-based coating formulations. The challenge has been to provide imaging elements containing layers having similar physical and chemical properties in the dried film to that obtained with organic solvent-based coatings, but which are the result of water-based coating compositions substantially free of organic solvents.

Water insoluble polymer particles contained in aqueous latexes and dispersions reported to be useful for coatings on photographic films typically have low glass transition temperatures (Tg) to insure coalescence of the polymer particles into a strong, continuous film. Generally the Tg of such polymers is less than 50° C., frequently the Tg is no more than 30° C. Typically these polymers are used in priming or "subbing" layers which are applied onto the film support to act as adhesion promoting layers for photographic emulsion layers. Such low Tg polymers, although useful when they underly an emulsion layer, are not suitable as, for example, backing layers since their blocking and ferrotyping resistance are poor. To fully coalesce a polymer latex with a higher Tg requires significant concentrations of coalescing aids. This is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion. Thus, there is a need for imaging elements containing layers that perform various functions not having the disadvantages associated with layers applied from organic solutions.

SUMMARY OF THE INVENTION

The invention provides an imaging element having a support, at least one light-sensitive layer and at least one layer comprising a coalesced layer of film-forming colloidal polymeric particles and non-film-forming colloidal polymeric particles.

The coalesced layers are especially suitable for imaging elements due to their high transparency and toughness.

DETAILED DESCRIPTION OF THE INVENTION

While the invention is applicable to all types of imaging elements such as, thermal imaging elements, electrophotographic elements, vesicular elements and the like, the invention is particularly applicable for use in photographic elements which, for the purpose of simplicity of explanation, will be referred to hereinafter. The coalesced layers can be employed as subbing layers, interlayers, emulsion layers, overcoat layers, backing layers, receiving layers, barrier layers, timing layers, antihalation layers, antistatic layers, stripping layers, mordanting layers, scavenger layers, antikinking layers, transparent magnetic layers and the like. The coalesced layers in accordance with this invention are particularly advantageous due to superior physical properties including transparency, toughness necessary for providing resistance to scratches, abrasion, blocking and ferrotyping, in addition to environmental considerations such as, the preparation of layers substantially free of solvents and general procedural advantages including ease of preparation together with short drying times.

Whether colloidal polymeric particles are film-forming or non-film-forming is determined by the following test:

An aqueous coating formulation of 3% by weight of colloidal polymeric particles free of organic solvent or coalescing aid, is applied to a sheet of polyethylene terephthalate in a wet coverage of 10 ml/m$^2$ and dried for 2 minutes at 75° C. Polymers that form clear, transparent continuous films under these conditions are film-forming, while those that do not form clear, transparent continuous films are non-film-forming, for the purpose of this invention.

The coalesced layers in accordance with this invention are formed from colloidal polymeric particles that are a discontinuous phase of solid, water-insoluble particles suspended in a continuous aqueous medium. The solid, water insoluble particles of both the film-forming and non-film-forming polymers have an average particle size of from 10 to 500 nm, preferably from 10 to 200 nm. The film forming polymer is present in the coalesced layer in an amount of from 20 to 70 percent by weight and preferably from 30 to 50 percent by weight based on the total weight of the layer.

The imaging elements in accordance with this invention comprise a support material having thereon at least one coalesced layer coated from an aqueous composition comprising a mixture of a film-forming, water dispersible polymer and a non-film-forming, water dispersible polymer. The support material may comprise various polymeric films including cellulose esters, such as cellulose acetate, cellulose diacetate, cellulose triacetate, cellulose acetate butyrate, cellulose propionate; polycarbonate, polystyrene, polyolefins, such as, polyethylene, polypropylene; polyesters, such as polyethylene terephthalate, polyethylene naphthalate; paper, glass, and the like. Polyester film support is preferred. The thickness of the support is not critical. Support thickness of 50 μm to 254 μm (2 to 10 mil) can be employed, for example, with very satisfactory results. The polyester support typically employs an undercoat or primer layer well known in the art that comprise, for example, a vinylidene chloride/methyl acrylate/itaconic acid terpolymer or vinylidene chloride/acrylonitrile/acrylic acid terpolymer as described in U.S. Pat. Nos. 2,627,088; 2,698,235; 2,698,240; 2,943,937; 3,143,421; 3,201,249; 3,271,178; and 3,501,301.

Coating compositions for preparing coalesced layers in accordance with the invention comprise a continuous aqueous phase having dispersed therein a mixture of film-forming polymeric particles (component A) and non-film-forming polymeric particles (component B). As in the coalesced layers, as indicated above, Component A comprises 20 to 70% of the total weight of components A and B of the coating composition. Other additional compounds may be added to the coating composition, depending on the function of the particular layer, including surfactants, emulsifiers, coating aids, matte particles, rheology modifiers, crosslinking agents, inorganic fillers such as metal oxide particles, pigments, magnetic particles, biocides and the like. The coating composition may also include small amounts of organic solvents, preferably the concentration of organic solvent is less than 1 weight % of the total coating composition.

The non-film-forming polymer (B) comprises glassy polymers that provide resistance to blocking, ferrotyping, abrasion and scratches. Non-film-forming polymer B is present in the coating composition and in the photographic layer in an amount of from 30 to 80 and preferably from 50 to 70 percent based on the total weight of film-forming polymer (A) and non-film-forming polymer (B). These polymers include addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. Other polymers that may comprise component B include water-dispersible condensation polymers such as polyesters, polyurethanes, polyamides, and epoxies. Polymers suitable for component B do not give transparent, continuous films upon drying when the above-described test is applied.

The film-forming polymer (A) comprises polymers that form a continuous film under the extremely fast drying conditions typical of the photographic film manufacturing process. Polymers that are suitable for component A are those that give transparent, continuous films when the above-described test is applied and include addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. Other suitable polymers useful as component A are film-forming dispersions of polyurethanes or polyesterionomers.

The colloidal polymeric particles can be prepared either by emulsion polymerization or by emulsifying pre-formed polymers in water with a proper dispersing agent. In both cases, chain transfer agents including mercaptans, polymercaptans, and halogen compounds can be sued in the polymerization mixture to moderate the polymer molecular weight. The weight average molecular weight of prepared polymers may vary from 5,000 to 30,000,000 and preferably from 50,000 to 10,000,000.

Preparation of polyurethane dispersions is well-known in the art and involves chain extending an aqueous dispersion of a prepolymer containing terminal isocyanate groups by reaction with a diamine or diol. The prepolymer is prepared by reacting a polyester, polyether, polycarbonate, or polyacrylate having terminal hydroxyl groups with excess polyfunctional isocyanate. This product is then treated with a compound that has functional groups that are reactive with an isocyanate, for example, hydroxyl groups, and a group that is capable of forming an anion, typically this is a carboxylic acid group. The anionic groups are then neutralized with a tertiary amine to form the aqueous prepolymer dispersion.

The term polyesterionomer refers to polyesters that contain at least one ionic moiety. Such ionic moieties function to make the polymer water dispersible. These polyesters are prepared by reacting one or more dicarboxylic acids or their functional equivalents such as anhydrides, diesters, or diacid halides with one or more diols in melt phase polycondensation techniques as described in U.S. Pat. Nos. 3,018,272; 3,929,489; 4,307,174; 4,419,437, incorporated herein by reference. Examples of this class of polymers include, for example, Eastman AQ polyesterionomers, manufactured by Eastman Chemical Co.

Typically the ionic moiety is provided by some of the dicarboxylic acid repeat units, the remainder of the dicarboxylic acid repeat units are nonionic in nature. Such ionic moieties can be anionic or cationic, but, anionic moieties are preferred for the present invention. Preferably, the ionic dicarboxylic acid contains a sulfonic acid group or its metal salt. Examples include the sodium, lithium, or potassium salt of sulfoterephthalic acid, sulfonaphthalene dicarboxylic acid, sulfophthalic acid, and sulfoisophthalic acid or their functional equivalent anhydride, diester, or diacid halide. Most preferably the ionic dicarboxylic acid repeat unit is provided by 5-sodiosulfoisophthalic acid or dimethyl 5-sodiosulfoisophthalate.

The nonionic dicarboxylic acid repeat units are provided by dicarboxylic acids or their functional equivalents represented by the formula:

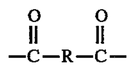

where R is an aromatic or aliphatic hydrocarbon or contains both aromatic and aliphatic hydrocarbons. Exemplary compounds include isophthalic acid, terephthalic acid, succinic acid, adipic acid, and others.

Suitable diols are represented by the formula: HO-R-OH, where R is aromatic or aliphatic or contains both aromatic and aliphatic hydrocarbons. Preferably the diol includes one or more of the following: ethylene glycol, diethylene glycol, or 1,4-cyclohexanedimethanol.

The polyesterionomer dispersions comprise from about 1 to about 25 mol %, based on the total moles of dicarboxylic acid repeat units, of the ionic dicarboxylic acid repeat units. The polyesterionomers have a glass transition temperature (Tg) of about 60° C. or less to allow the formation of a continuous film.

The film-forming polymeric particles, the non-film-forming polymeric particles or both type particles may include reactive functional groups capable of forming covalent bonds by intermolecular crosslinking or by reaction with a crosslinking agent (i.e., a hardener). Suitable reactive functional groups include: hydroxyl, carboxyl, carbodiimide, epoxide, aziridine, vinyl sulfone, sulfinic acid, active methylene, amino, amide, allyl, and the like.

The coating compositions in accordance with the invention may also contain suitable crosslinking agents that may effectively be used in the coating compositions of the invention including aldehydes, epoxy compounds, polyfunctional aziridines, vinyl sulfones, methoxyalkyl melamines, triazines, polyisocyanates, dioxane drivatives such as dihydroxydioxane, carbodiimides, chrome alum, and zirconium sulfate, and the like. The crosslinking agents may react with functional groups present on either the film-forming polymers, the non-film-forming polymers or on both.

Matte particles well known in the art may be used in the coating composition of the invention, such matting agents have been described in Research Disclosure No. 308, published Dec 1989, pages 1008 to 1009. When polymeric matte particles are employed, the polymers may contain reactive functional groups capable of forming covalent bonds by intermolecular crosslinking or by reaction with a crosslinking agent (i.e., a hardener) in order to promote improved adherence to the film-forming and non-film-forming polymers of the invention. Suitable reactive functional groups include: hydroxyl, carboxyl, carbodiimide, epoxide, aziridine, vinyl sulfone, sulfinic acid, active methylene, amino, amide, allyl, and the like.

The coating compositions of the present invention may also include lubricants or combinations of lubricants to reduce sliding friction of the photographic elements in accordance with the invention. Virtually any type of water soluble or dispersible lubricants can be used. For example, (1) water soluble or dispersible paraffin or wax-like materials, including vegetable waxes, insect waxes, mineral waxes, petroleum waxes, synthetic waxes, carnauba wax, as well as wax-like components that occur individually in these waxes, (2) perfluoro- or fluoro- or fluorochloro-containing materials, which include poly(tetrafluoroethylene), poly (trifluorochloroethylene), poly(vinylidene fluoride), poly (trifluorochloroethylene-co-vinyl chloride), poly(meth) acrylates containing fluoro or perfluoroalkyl side groups, and the like, (3) poly(meth)acrylates or poly(meth) acrylamides containing long alkyl side groups, (4) silicone lubricants including siloxane containing various (cyclo) alkyl, aryl, epoxypropylalkyl, polyoxyethylene, and polyoxypropylene side groups, and the like.

The above lubricants also may contain reactive functional groups such as hydroxyl, carboxyl, carbodiimide, epoxide, aziridine, vinyl sulfone, sulfinic acid, active methylene, amino, and amide. The amount of lubricants can be incorporated in the coating composition in an amount from 0.1 to 150 $mg/m^2$, preferably from 0.1 to 90 $mg/m^2$.

Any of the reactive functional groups of the polymers and any of the crosslinking agents described in U.S. Pat. No. 5,057,407 and the patents cited therein may be used in accordance with this invention.

The compositions of the present invention may be applied as aqueous coating formulations containing up to about 50% total solids by coating methods well known in the art. For example, hopper coating, gravure coating, skim pan/air knife coating, spray coating, and other methods may be used with very satisfactory results. The coatings are dried at temperatures up to 150° C. to give dry coating weights of 20 $mg/m^2$ to 10 $g/m^2$.

The invention is applicable to thermal imaging elements wherein the coalesced layer may be employed as supports, dye-donor elements, dye-image receiving layers, barrier layers, overcoats, binders and the like, as described in U.S. Pat. Nos. 5,288,689; 5,283,225; 4,772,582; 5,166,128, and incorporated herein.

The invention is further illustrated by the following examples in which parts and percentages are by weight unless otherwise stated. Polymeric particles used in the example coatings together with the film-forming character of each are listed in Table 1. The film forming characteristic of each polymer is defined by the test set forth above.

TABLE 1

| Poly-mer | Polymer Comosition | Tg. °C. | Description |
|---|---|---|---|
| P-1 | Methyl methacrylate homopolymer | 125 | Non-film-forming |
| P-2 | Methyl methacrylate/ methacrylic acid 97/3 | 130 | Non-film-forming |
| P-3 | Methacrylonitrile homopolymer | 115 | Non-film-forming |
| P-4 | Methacrylonitrile/ methacrylic acid 97/3 | 115 | Non-film-forming |
| P-5 | Styrene/methacrylic acid 97/3 | 100 | Non-film-forming |
| P-6 | Butyl acrylate/acrylic acid 97/3 | −40 | Film-forming |
| P-7 | Butyl acrylate/methyl methacrylate/acrylic acid 48.5/48.5/3 | 20 | Film-forming |
| P-8 | butyl acrylate/2-sulfo-1,1-dimethylethyl acrylamide/methyl 2-acrylamido-2-methoxyacetate 90/5/5 | −20 | Film-forming |
| P-9 | Dow 620 latex (styrene-butadiene) | 15 | Film-forming |
| P-10 | Dow 615 latex (styrene-butadiene) | 10 | Film-forming |
| P-11 | ICI Neorez 960 polyurethane dispersion | 10 | Film-forming |
| P-12 | Eastman Chemical Co. AQ29D polyesterionomer dispersion | 29 | Film-forming |
| P-13 | Eastman Chemical Co. AQ55D polyesterionomer dispersion | 55 | Film-forming |

COMPARATIVE SAMPLES A–G AND EXAMPLES 1–16

Aqueous coating solutions comprising 3 weight % total solids were coated with a doctor blade onto polyethylene terephthalate film support that had been subbed with a terpolymer latex of acrylonitrile vinylidene chloride, and acrylic acid. The coating was dried at 90° C. for one minute and the coating appearance recorded, the results are listed in Table 2. Transparent, high-quality films that are comparable in appearance to organic solvent applied coatings were obtained for the coating compositions of the invention.

TABLE 2

| Coating | Polymer A Film Forming | Polymer B Non-film-forming | B/A | Appearance |
|---|---|---|---|---|
| Sample A | none | P-1 | 100/0 | Powdery/ non-continuous |
| Sample B | none | P-2 | 100/0 | Powdery/ non-continuous |
| Sample C | none | P-3 | 100/0 | Powdery/ non-continuous |
| Sample D | none | P-4 | 100/0 | Powdery/ non-continuous |
| Sample E | none | P-5 | 100/0 | Powdery/ non-continuous |
| Sample F | P-11 | P-1 | 90/10 | Very hazy/ non-continuous |
| Sample G | P-11 | P-1 | 80/20 | Hazy |
| Example 1 | P-11 | P-1 | 72.5/27.5 | Excellent |
| Example 2 | P-11 | P-1 | 70/30 | Excellent |
| Example 3 | P-11 | P-2 | 70/30 | Excellent |
| Example 4 | P-11 | P-3 | 70/30 | Excellent |
| Example 5 | P-11 | P-4 | 70/30 | Excellent |
| Example 6 | P-11 | P-5 | 70/30 | Excellent |
| Example 7 | P-6 | P-2 | 70/30 | Excellent |
| Example 8 | P-6 | P-2 | 70/30 | Excellent |
| Example 9 | P-7 | P-2 | 70/30 | Excellent |
| Example 10 | P-8 | P-2 | 70/30 | Excellent |
| Example 11 | P-9 | P-1 | 70/30 | Continuous film/slight haze |
| Example 12 | P-10 | P-1 | 70/30 | Continuous film/slight haze |
| Example 13 | P-12 | P-2 | 70/30 | Excellent |
| Example 14 | P-13 | P-2 | 70/30 | Excellent |
| Example 15 | P-11 | P-2 | 50/50 | Excellent |
| Example 16* | P-11 | P-2 | 60/40 | Excellent |

*PFAZ ® 322 polyfunctional aziridine, Sybron Chemicals Inc., added at 10 wt % of solids.

COMPARATIVE SAMPLES H, I AND EXAMPLES 17–25

The following examples demonstrate the excellent physical properties that are obtained with coating compositions of the invention. Aqueous formulations comprising 3 weight % total solids were applied onto subbed film support as in the previous examples and dried at 90° C. for one minute to give transparent films with a dry coating weight of 750 mg/m$^2$. Taber abrasion for the coatings were measured and compared with a 750 mg/m$^2$ coating of Elvacite 2041 (methyl methacrylate polymer sold by E. I. DuPont de Nemours and Co.) that had been coated from methylene chloride solution. The Taber abrasion tests were performed in accordance with the procedures set forth in ASTM D1044. The results are given in Table 3.

TABLE 3

| Coating | Description | Taber Abr. (% haze) |
|---|---|---|
| Sample H | Solvent coated Elvacite 2041 | 7.0 |
| Sample I | P-11 | 13.5 |
| Example 17 | P-2/P-11 70/30 ratio | 7.0 |
| Example 18 | P-2/P-11 70/30 ratio, with aziridine* | 7.0 |
| Example 19 | P-2/P-11 72.5/27.5 ratio, with aziridine* | 7.0 |
| Example 20 | P-2/P-12 70/30 ratio | 9.8 |
| Example 21 | P-2/P-13 70/30 ratio | 11.0 |
| Example 22 | P-2/P-13 70/30 ratio, with aziridine* | 8.4 |
| Example 23 | P-2/P-11 50/50 ratio with aziridine* | 7.0 |
| Example 24 | P-2/P-11 40/60 ratio with aziridine* | 11.0 |
| Example 25 | P-2/P-11/Ludox AM 35/32.5/32.5 | 7.5 |

*PFAZ ® 322 polyfunctional aziridine, Sybron Chemicals Inc., added at 10 wt % of solids.

COMPARATIVE SAMPLES J–L AND EXAMPLES 26–39

The following examples show that the coating compositions of the invention provide void-free, impermeable films that are comparable with organic solvent applied layers. A subbed polyester film support as previously described was coated with an aqueous antistatic formulation comprising 0.025 weight % of silver-doped vanadium pentoxide, 0.075 weight % of a terpolymer latex of methylacrylate, vinylidene chloride, and itaconic acid (15/83/2) and dried at 100° C. to yield an antistatic layer having a dry weight of about 8 mg/m$^2$. Aqueous coating compositions of the invention containing 1 to 3 weight % solids were applied over the antistatic layer and dried for 90 seconds at 100° C. to yield transparent coatings having a dry weight of 250 to 750 mg/m$^2$. It is known (described in U.S. Pat. Nos. 5,006,451 and 5,221,598) that the antistatic properties of the vanadium pentoxide layer are destroyed after film processing if not protected by an impermeable barrier. Thus, the permeability of the example coatings could be evaluated by measuring the antistatic properties of the samples after processing in conventional film developing and fixing solutions.

The samples were soaked in high pH (11.3) developing and fixing solutions as described in U.S. Pat. No. 4,269,929, at 38° C. for 60 seconds each and then rinsed in distilled water. The internal resistivity (using the salt bridge method) of the processed samples at 20% relative humidity was measured and compared with the internal resistivity before processing. The coating compositions and results are reported in Table 4. The results show that coating compositions of the invention give void-free coatings that are as impermeable as a solvent cast film (sample J) and are far superior to an aqueous coating composition comprising only the high Tg methyl methacrylate copolymer dispersion alone (sample K).

TABLE 4

| Coating | Description | Coating Weight ($mg/m^2$) | Resistivity Before Process log Ω/sq. | Resistivity After Process log Ω/sq. |
|---|---|---|---|---|
| Sample J | Solvent Coated Elvacite 2041 | 750 | 7.5 | 7.7 |
| Sample K | P-2 without film-forming polymer | 750 | 7.5 | >14.0 |
| Sample L | P-11 without non-film-forming polymer | 750 | 9.3 | 10.3 |
| Example 26 | P-2/P-12 70/30 ratio | 750 | 7.9 | 8.3 |
| Example 27 | P-2/P-13 70/30 ratio | 750 | 8.0 | 8.1 |
| Example 28 | P-2/P-11 70/30 ratio | 750 | 8.0 | 8.9 |
| Example 29 | P-2/P-11 70/30 ratio, with aziridine* | 750 | 7.6 | 7.6 |
| Example 30 | P-2/P-7 70/30 ratio, with aziridine* | 750 | 7.6 | 7.6 |
| Example 31 | P-5/P-11 70/30 ratio | 750 | 7.6 | 7.7 |
| Example 32 | P-5/P-13 70/30 ratio | 750 | 7.6 | 7.8 |
| Example 33 | P-3/P-11 70/30 ratio | 750 | 8.0 | 8.0 |
| Example 34 | P-4/P-11 70/30 ratio, with aziridine* | 750 | 7.8 | 7.9 |
| Example 35 | P-2/P-11 70/30 ratio, with aziridine* | 250 | 8.5 | 8.7 |
| Example 36 | P-2/P-11 50/50 ratio | 1000 | 7.3 | 7.2 |
| Example 37 | P-2/P-11 40/60 ratio | 1000 | 7.3 | 7.9 |
| Example 38 | P-2/P-11 70/30 ratio with aziridine* and polymethylmethacrylate 2 μm matte | 750 | 7.2 | 7.3 |
| Example 39 | P-2/P-11 70/30 ratio with aziridine* and polymethylmethacrylate-co-methacrylic acid 2 μm matte | 750 | 7.4 | 7.5 |

*PFAZ ® 322 polyfunctional aziridine, Sybron Chemicals Inc., added at 10 wt % of solids.

EXAMPLES 40–42

In addition to testing procedures already described, Paper Clip Friction (PCF) and Single Arm Scratch were measured for the following examples using the procedure set forth in ANSI IT 9.4–1992 and ANSI PH 1.37–1977, respectively. These examples serve to illustrate the excellent lubricity and scratch resistance that can be obained with coating compositions of the invention upon incorporation of various lubricant materials. The coatings of the invention were applied over a conductive layer comprising vanadium pentoxide as described in previous examples.

TABLE 5

| Coating | Description | Coating Weight ($mg/m^2$) | Resistivity Before Process log Ω/sq. | Resistivity After Process log Ω/sq. | PCF | Single Arm Scratch (gms) |
|---|---|---|---|---|---|---|
| Example 40 | P-2/P-11 70/30 ratio with aziridine.* Michemlube** 160 at 7.5 $mg/m^2$ | 1000 | 8.2 | 7.6 | 0.20 | — |
| Example 41 | P-2/P-11/Teflon 30+ 62/35/3 ratio with aziridine* | 750 | 7.6 | 7.6 | 0.15 | 70 |
| Example 42 | P-2/P-11/Teflon 3170+ 62/35/3 ratio with aziridine* | 750 | 7.8 | 7.9 | 0.125 | 110 |

+Teflon 30 and Teflon 3170 aqueous dispersions available from DuPont de Nemours and Co.
**Aqueous carnauba wax dispersion sold by Michelman Inc.
*PFAZ ® 322 polyfunctional aziridine, Sybron Chemicals Inc., added at 10 wt % of solids.

EXAMPLE 43

This example illustrates the incorporation of a conductive metal oxide particle in the coatings of the invention. A coating comprising a 15/35/50 weight ratio of polymer P-2/polymer P-11/conductive tin oxide particles was applied onto a subbed polyester support to give a transparent coating with a total dried weight of 1000 $mg/m^2$. The conductive tin oxide was Keeling & Walker CPM375 antimony-doped tin oxide that had been milled to an average particle size of about 50 nm. The surface resistivity of the coating measured at 20% RH before and after film processing using a two-point probe was 9.9 and 10.3 log Ω/square, respectively.

What is claimed is:

1. A coating composition for applying a transparent layer to a photographic element which comprises a continuous aqueous phase having dispersed therein film-forming colloidal polymeric particles and non-film-forming colloidal polymeric particles, the film-forming and non-film-forming colloidal polymeric particles having an average particle size of from 10 to 500 nm; whether the colloidal polymeric particles are film-forming or non-film-forming being determined by applying an aqueous coating formulation of 3% by weight of said colloidal polymeric particles free of organic solvent or coalescing aid to a sheet of polyethylene terephthalate in a wet coverage of 10 $ml/m^2$ and drying for 2 minutes at 75° C., polymers that form clear, transparent continuous films under these conditions are film-forming, while those that do not form clear, transparent continuous films are non-film-forming.

2. The coating composition of claim 1 wherein the film-forming polymeric particles are present in an amount of from 20 to 70% by weight based on the total weight of the film-forming and non-film-forming polymeric particles.

3. The coating composition of claim 2 wherein the film-forming polymeric particles are present in the amount of from 30 to 50 percent by weight.

4. The coating composition of claim 1 wherein the average particle size is from 10–200 nm.

5. The coating composition of claim 1 wherein the film-forming colloidal polymeric particles or the non-film-forming colloidal particles contain crosslinkable groups.

6. The coating composition of claim 5 wherein a crosslinking agent is included.

7. The coating composition of claim 5 wherein the film-forming colloidal polymeric particles contain crosslinkable groups.

8. The coating composition of claim 5 wherein the non-film-forming colloidal polymeric particles contain crosslinkable groups.

9. The coating composition of claim 5 wherein the crosslinkable groups are carboxylic acid groups.

10. The coating composition of claim 6 wherein the crosslinking agents is a polyfunctional aziridine.

11. The coating composition of claim 1 wherein polymeric matting agent is present.

12. The coating composition of claim 11 wherein the polymeric matting agent contains carboxylic acid groups.

* * * * *